(12) United States Patent
Lutz

(10) Patent No.: US 10,786,957 B2
(45) Date of Patent: Sep. 29, 2020

(54) SYSTEM, METHOD, AND APPARATUS FOR INFUSING A COMPOSITE STRUCTURE

(71) Applicant: General Electric Company, Schenectady, NY (US)

(72) Inventor: Andreas Lutz, Bavaria (DE)

(73) Assignee: General Electric Company, Schenectady, NY (US)

( * ) Notice: Subject to any disclaimer, the term of this patent is extended or adjusted under 35 U.S.C. 154(b) by 651 days.

(21) Appl. No.: 15/419,444

(22) Filed: Jan. 30, 2017

(65) Prior Publication Data

US 2018/0215111 A1 Aug. 2, 2018

(51) Int. Cl.
| | |
|---|---|
| *B29C 70/54* | (2006.01) |
| *B29C 70/44* | (2006.01) |
| *B29C 33/02* | (2006.01) |
| *B29L 31/30* | (2006.01) |
| *B29K 63/00* | (2006.01) |

(52) U.S. Cl.
CPC ............ *B29C 70/548* (2013.01); *B29C 33/02* (2013.01); *B29C 70/44* (2013.01); *B29C 70/443* (2013.01); *B29K 2063/00* (2013.01); *B29L 2031/3076* (2013.01)

(58) Field of Classification Search
CPC ............................ B29C 70/548; B29C 70/443
See application file for complete search history.

(56) References Cited

U.S. PATENT DOCUMENTS

| | | | |
|---|---|---|---|
| 7,255,549 B2 | 8/2007 | Hadley | |
| 7,633,040 B2 | 12/2009 | Glain et al. | |
| 7,758,800 B2 | 7/2010 | Cicci et al. | |
| 8,652,371 B2 | 2/2014 | Smith et al. | |
| 8,808,612 B2 | 8/2014 | Alms et al. | |
| 8,940,213 B2 | 1/2015 | Lockett et al. | |
| 8,968,617 B2 | 3/2015 | Wadsworth et al. | |
| 9,452,568 B2 | 9/2016 | Corral et al. | |
| 2003/0011094 A1 | 1/2003 | Filsinger et al. | |
| 2012/0043704 A1 | 2/2012 | Hawkins | |

(Continued)

FOREIGN PATENT DOCUMENTS

| | | |
|---|---|---|
| DE | 691 18 374 T2 | 10/1996 |
| EP | 2 620 265 A1 | 7/2013 |
| EP | 2650110 A1 | 10/2013 |

(Continued)

OTHER PUBLICATIONS

Parthasarathy et al., "Real-time sensing and control of resin flow in liquid injection molding processes", American Control Conference, 1998. Proceedings of the 1998, vol. 4, pp. 2181-2184, Jun. 26, 1998, Philadelphia, PA.

Matsuzaki et al., "Control of resin flow/temperature using multifunctional inter digital electrode array film during a VaRTM process", Composites Part A: Applied Science and Manufacturing, vol. 42, Issue: 7, pp. 78-793, Jul. 2011.

(Continued)

*Primary Examiner* — Jacob T Minskey
*Assistant Examiner* — Melody Tsui
(74) *Attorney, Agent, or Firm* — Armstrong Teasdale LLP

(57) ABSTRACT

An apparatus for infusing a composite structure includes a reservoir configured to receive a volume of resin, a base, a membrane configured to be sealed upon the base, and a flow medium in fluid communication with the reservoir. The flow medium includes a first flow medium portion disposed in contact with at least a portion of the base and a second flow medium portion disposed in contact with at least a portion of the membrane.

20 Claims, 7 Drawing Sheets

(56) References Cited

U.S. PATENT DOCUMENTS

2014/0131916 A1\* 5/2014 Wadsworth .......... B29C 70/443
264/238

FOREIGN PATENT DOCUMENTS

| EP | 2913180 A1 | 9/2015 |
|---|---|---|
| JP | S5859817 A | 4/1983 |
| JP | 2004181627 A | 7/2004 |
| JP | 2008179149 A | 8/2008 |
| JP | 2009125976 A | 6/2009 |
| JP | 2011046194 A | 3/2011 |
| JP | 2012086547 A | 5/2012 |

OTHER PUBLICATIONS

Kedari et al., "Effects of vacuum pressure, inlet pressure, and mold temperature on the void content, volume fraction of polyesterle-glass fiber composites manufactured with VARTM process", Journal of Composite Materials, vol. 45, Issue: 28, pp. 2727-2742, Dec. 2011.

Ohlendorf, J-H., et al., "Intelligent Production of Rotor Blades using IT-aided Automation Approaches," DEWI Magazin, No. 37, pp. 16-25 (Aug. 31, 2010).

Partial European Search Report and Opinion issued in connection with corresponding EP Application No. 18153741.6 dated Jun. 27, 2018.

Japanese Office Action for related Application No. 2018-005250, dated Feb. 28, 2019, 9 pages (Translated).

\* cited by examiner

SYSTEM, METHOD, AND APPARATUS FOR INFUSING A COMPOSITE STRUCTURE

BACKGROUND

The subject matter disclosed herein relates to a system, method, and apparatus for infusing a composite structure and, more particularly, to a system, method, and apparatus for infusing a composite structure in which a flow rate of resin through a flow medium is controlled.

At least some resin infusion systems are used in the manufacture and construction of laminated composite structures, such as in the aerospace industry for the construction of composite airframes and airframe structural members. Laminated composite structures are typically constructed from a plurality of layers of material, or "plies," which are placed over a form and saturated or infused with a resin, such as an epoxy, for reinforcement.

Many known resin infusion systems include a base, or in some cases, a mandrel, over which a composite structure is placed for resin infusion. A vacuum bag may be placed over the composite structure and sealed upon the base. The base and vacuum bag are placed in an autoclave or oven, at which point a resin is introduced for infusion of the composite structure. Such systems heat the resin to a substantially uniform temperature corresponding to the temperature of the autoclave within which the composite structure is placed and cured. The resin may flow unevenly over the surface of the composite structure, resulting in air pockets, air bubbles, or other variations in the thickness of the laminated surface of the structure.

BRIEF DESCRIPTION

In one aspect, an apparatus for infusing a composite structure is provided. The apparatus includes a reservoir configured to receive a volume of resin, a base, a membrane configured to be sealed upon the base, and a flow medium in fluid communication with the reservoir. The flow medium includes a first flow medium portion disposed in contact with at least a portion of the base, and a second flow medium portion disposed in contact with at least a portion of the membrane.

In another aspect, a method for infusing a composite structure is provided. The method includes disposing a composite structure on a base, disposing a membrane over the composite structure, sealing the membrane upon the base, heating at least one base heating field to induce a flow of resin within a first flow medium portion of a flow medium disposed between the base and the composite structure, heating at least one membrane heating field to induce a flow of resin within a second flow medium portion of the flow medium disposed between the membrane and the composite structure.

In yet another aspect, an apparatus for infusing a composite structure is provided. The apparatus includes a reservoir configured to receive a volume of resin, and a base including a first base heating field configured to draw a flow of resin towards a center of the base, and a second base heating field configured to draw the flow of resin towards a perimeter of the base. The apparatus also includes a membrane configured to be sealed upon the base. The membrane includes a first membrane heating field configured to draw the flow of resin from the perimeter of the base towards a perimeter of the membrane, and a second membrane heating field configured to draw the flow of resin towards a center of the membrane.

DRAWINGS

These and other features, aspects, and advantages of the present disclosure will become better understood when the following detailed description is read with reference to the accompanying drawings in which like characters represent like parts throughout the drawings, wherein.

Figure 1:
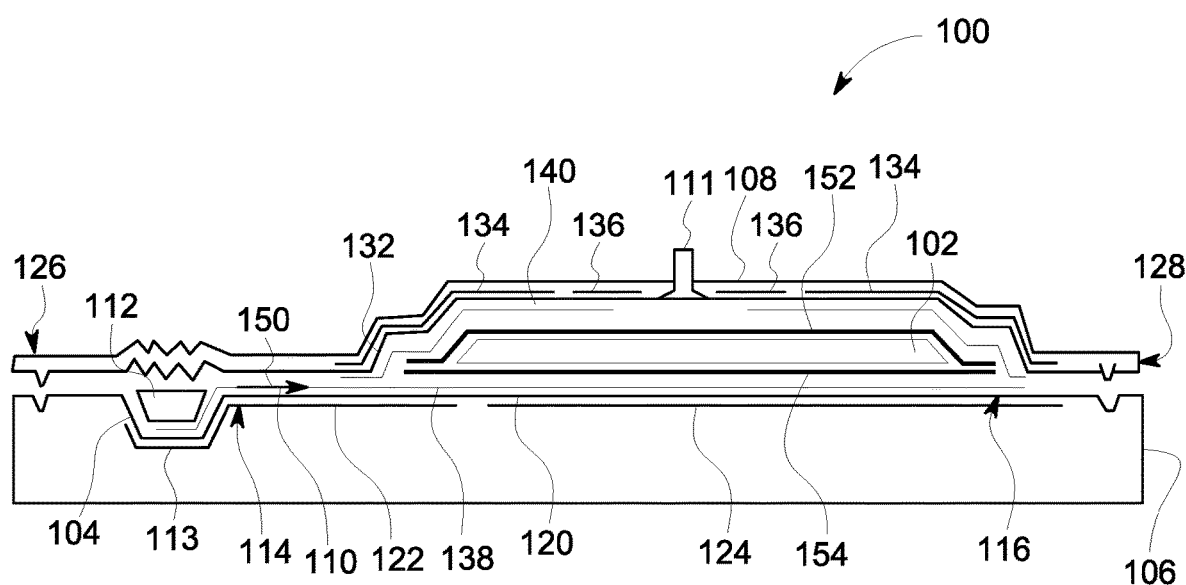
FIG. 1 is a cross-sectional view of an exemplary apparatus for infusing a composite structure.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to an apparatus for infusing a composite structure. The apparatus facilitates a resin infusion process, in which a flow rate of a flow of resin is controlled and controllable based upon activation sequences associated with one or more base heating fields and one or more membrane heating fields. Specifically, one or more base heating fields are activated according to an activation sequence to control a rate at which a flow of resin flows within a first flow medium portion of a flow medium, and one or more membrane heating elements are activated according to another activation sequence to control a rate at which the flow of resin flows within a second flow medium portion of the flow medium. As the flow of resin flows within each of the first and second flow medium portions, the composite structure is infused with resin, resulting in an even distribution of resin within composite structure.

Although an apparatus for infusing a composite part is described below with reference to various base heating fields and membrane heating fields, it will be understood that the apparatus may assume various shapes and may include any number of base heating fields and/or membrane heating fields, including, in some embodiments, no base heating elements and/or no membrane heating fields. For instance, in some embodiments, the apparatus may not include any membrane heating fields, and may only include a single base heating field. Thus, the number and placement of various heating fields may vary substantially and are not essential to an understanding of the present disclosure.

FIG. 1 is a cross-sectional view of an exemplary apparatus 100 for infusing a composite structure 102. Apparatus 100 includes a reservoir 104, a base 106, a membrane 108, a flow medium 110, and a vacuum port 111.

Composite structure 102 is a laminated composite structure that is constructed from a plurality of layers of material, or "plies," which are placed over a form or preform and configured to be saturated or infused with a resin for reinforcement. In one embodiment, composite structure 102 is a panel or sandwich panel that is used in the construction of an aircraft. In another embodiment, composite structure 102 is a monolithic structure. Composite structure 102 includes an upper portion 152 and a lower portion 154.

Reservoir 104 is a recess or well and is configured to receive a volume of resin 112, such as a cold or frozen volume of resin, a room temperature volume of resin, or a heated volume of resin. In the exemplary embodiment, reservoir 104 is formed in base 106. However, in some embodiments, reservoir 104 is not formed in base 106, but situated in apart from base 106 and in fluid communication with apparatus 100.

Reservoir 104 includes at least one reservoir heating field 113. Reservoir heating field 113 includes one or more heating elements, such as, for example, one or more electrical heating elements, which may be supplied electrical current and which generate heat as a result. Accordingly, reservoir heating field 113 is coupled to an electrical power supply (not shown). In alternative embodiments, any other suitable heating mechanism is used, such as a circulating heated fluid.

Reservoir heating field 113 heats reservoir 104, such that a volume of resin 112 is heated within reservoir 104. As volume of resin 112 is heated within reservoir 104, a viscosity of volume of resin 112 is reduced, such that volume of resin 112 is able to flow as a flow of resin 150, as described herein. For example, in the exemplary embodiment, flow of resin 150 flows within flow medium 110. In alternative embodiments, flow of resin 150 flows within or over any other suitable channel or surface, such as a channel or surface incorporated within base 106 and/or membrane 108. Thus, in some embodiments, flow medium 110 is omitted.

Volume of resin 112 is any type of resin suitable for infusing composite structure 102. For example, volume of resin 112 is any monocomponent or multicomponent resin designed for composite structure infusion or resin transfer molding. In one embodiment, volume of resin 112 is HEXFLOW RTM6 resin.

Base 106 is a mounting structure configured to receive composite structure 102. Base 106 includes a proximal end 114 and a distal end 116. In some embodiments, reservoir 104 is formed in base 106, such as at or near proximal end 114.

Base 106 also includes a first flow medium surface 120 that is in fluid communication with reservoir 104 and that extends substantially between proximal end 114 and distal end 116. In some embodiments, flow medium 110 is disposed over or in contact with first flow medium surface 120. In other embodiments, flow medium 110 is disposed within a channel or groove (not shown) formed within base 106.

Base 106 also includes a plurality of base heating fields, such as base heating fields 122 and 124. Although two base heating fields 122 and 124 are shown, any suitable number of base heating fields that enable operation of apparatus 100, as described herein, may be used. In some embodiments, no base heating fields are included, because membrane 108 is solely configured to supply heat for infusing composite structure 102.

In the exemplary embodiment, base heating fields 122 and 124 are disposed within base 106. In an alternative embodiment, base heating fields 122 and 124 are disposed in contact with first flow medium surface 120 of base 106. Base heating fields 122 and 124 include one or more heating elements (not shown), such as, for example, one or more electrical heating elements, which may be supplied electrical current and which generate heat as a result. Accordingly, base heating fields 122 and 124 are coupled to an electrical power supply (not shown). In alternative embodiments, any other suitable heating mechanism is used, such as a circulating heated fluid.

Membrane 108 is a flexible lamina or sheathing that is substantially gas impermeable, such as a "vacuum bag." Membrane 108 includes a proximal end 126 and a distal end 128. In the exemplary embodiment, membrane 108 is configured to be sealed upon base 106, such as by the application of a vacuum between membrane 108 and base 106.

Membrane 108 also includes a second flow medium surface 132 that is in fluid communication with reservoir 104 and that extends between proximal end 126 and distal end 128. In some embodiments, flow medium 110 is disposed over or in contact with second flow medium surface 132. In other embodiments, flow medium 110 is disposed within a channel or groove (not shown) formed within membrane 108.

Membrane 108 also includes a plurality of membrane heating fields, such as membrane heating fields 134 and 136. Although two membrane heating fields 134 and 136 are shown, any suitable number of membrane heating fields that enable operation of apparatus 100, as described herein, may be used. In some embodiments, no membrane heating fields are included.

In the exemplary embodiment, membrane heating fields 134 and 136 are disposed within membrane 108. In an alternative embodiment, membrane heating fields 134 and 136 are disposed in contact with second flow medium surface 132 of membrane 108. Membrane heating fields 134 and 136 include one or more heating elements (not shown), such as, for example, one or more electrical heating elements, which may be supplied electrical current and which generate heat as a result. Accordingly, membrane heating fields 134 and 136 are coupled to an electrical power supply (not shown). In alternative embodiments, any other suitable heating mechanism is used, such as a circulating heated fluid.

Flow medium 110 includes any material that absorbs and diffuses volume of resin 112 as it is heated and reduces in viscosity. For example, in some embodiments, flow medium 110 is a fibrous, porous, and/or mesh material that absorbs heated resin and through which flow of resin 150 is able to flow.

In the exemplary embodiment, flow medium 110 is bifurcated and includes a first flow medium portion (or first branch) 138 and a second flow medium portion (or second branch) 140. First flow medium portion 138 is disposed over at least a portion of base 106, such as over first flow medium surface 120. Similarly, second flow medium portion 140 is disposed over at least a portion of membrane 108, such as over second flow medium surface 132. In an embodiment that includes resin channels (not shown), first flow medium portion 138 is disposed within a first resin channel (not shown) formed within base 106, and second flow medium portion 140 is disposed within a second resin channel (not shown) formed within membrane 108. Further, although two flow medium portions 138 and 140 are shown, flow medium 110 may be limited to a single flow medium portion (either 138 or 140) and/or greater than two flow medium portions may be used.

Vacuum port 111 is a vacuum port through which vacuum is pulled between base 106 and membrane 108. In the exemplary embodiment, vacuum port 111 is disposed substantially centrally within membrane 108. However, vacuum port 111 may be disposed at any suitable location within membrane 108, such as towards proximal end 126 or distal end 128 of membrane 108. Such an embodiment is described below with reference to FIGS. 6-9.

Figure 2:
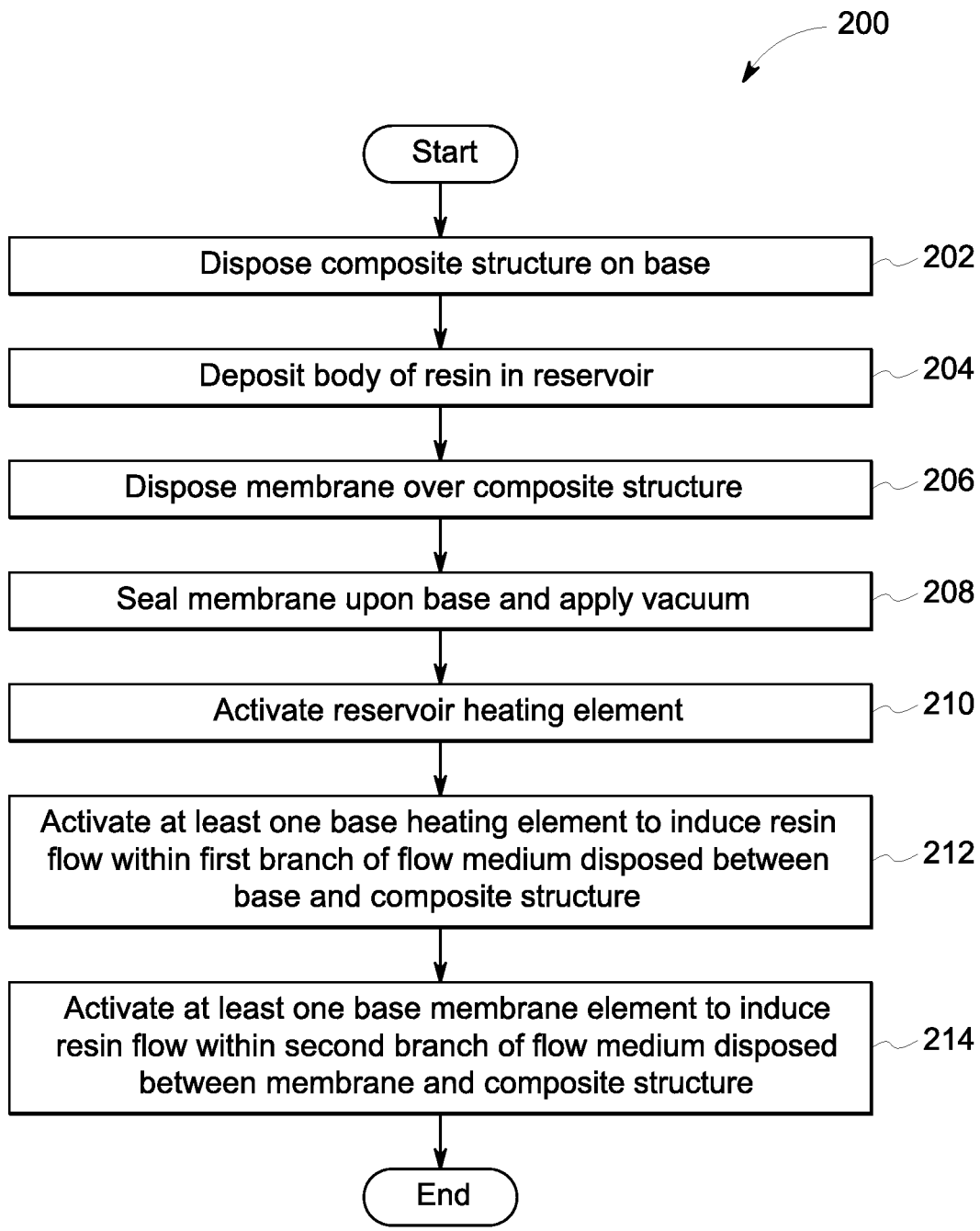
FIG. 2 is a flowchart that shows a process for infusing a composite structure using the apparatus shown in FIG. 1.

FIG. 2 is a flowchart that shows an infusion process 200 for infusing composite structure 102. FIG. 2 is described below in conjunction with FIGS. 3-9, which are cross-sectional views of apparatus 100 in operation and which are intended to illustrate infusion process 200. Accordingly, in the exemplary embodiment, composite structure 102 is disposed or seated upon base 106 (step 202), and volume of resin 112 is deposited within reservoir 104 (step 204). Membrane 108 is further disposed over composite structure 102 (step 206) and sealed upon base 106 under vacuum (step 208), such that composite structure 102 is enveloped or sealed between base 106 and membrane 108.

Figure 3:
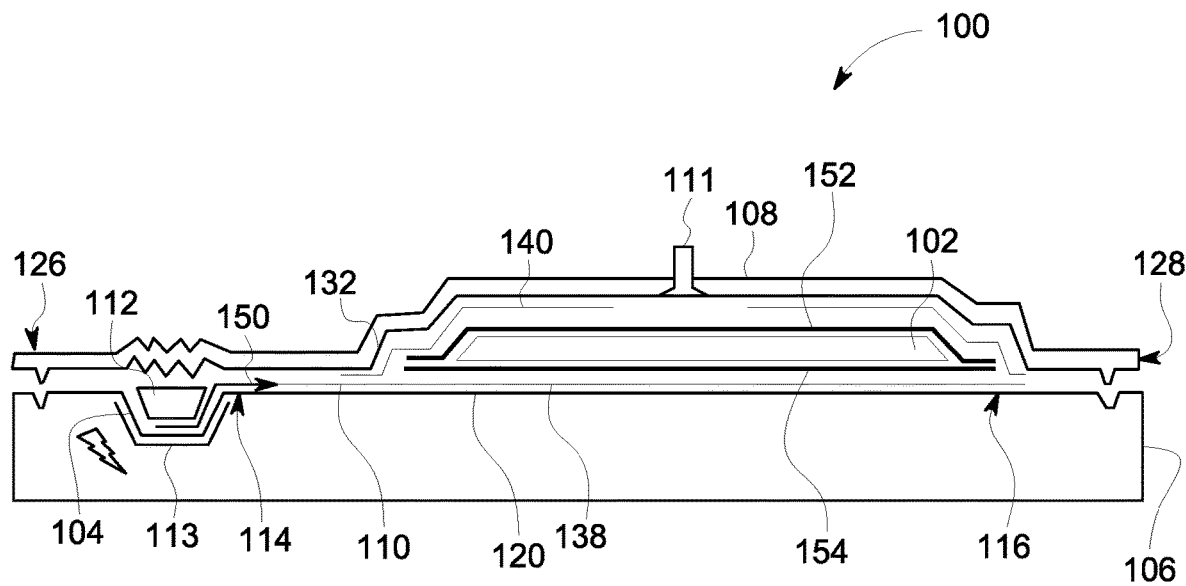
FIG. 3 is a cross-sectional view of the apparatus shown in FIG. 1, in which a reservoir including a volume of resin is heated.

FIG. 3 is a cross-sectional view of the apparatus 100, in which a reservoir including volume of resin 112 is heated. In particular, reservoir heating field 113 is activated (step 210) to heat volume of resin 112 within reservoir 104. As volume of resin 112 is heated within reservoir 104, the viscosity of volume of resin 112 is reduced, and volume of resin 112 becomes fluid or semifluid.

Figure 4:
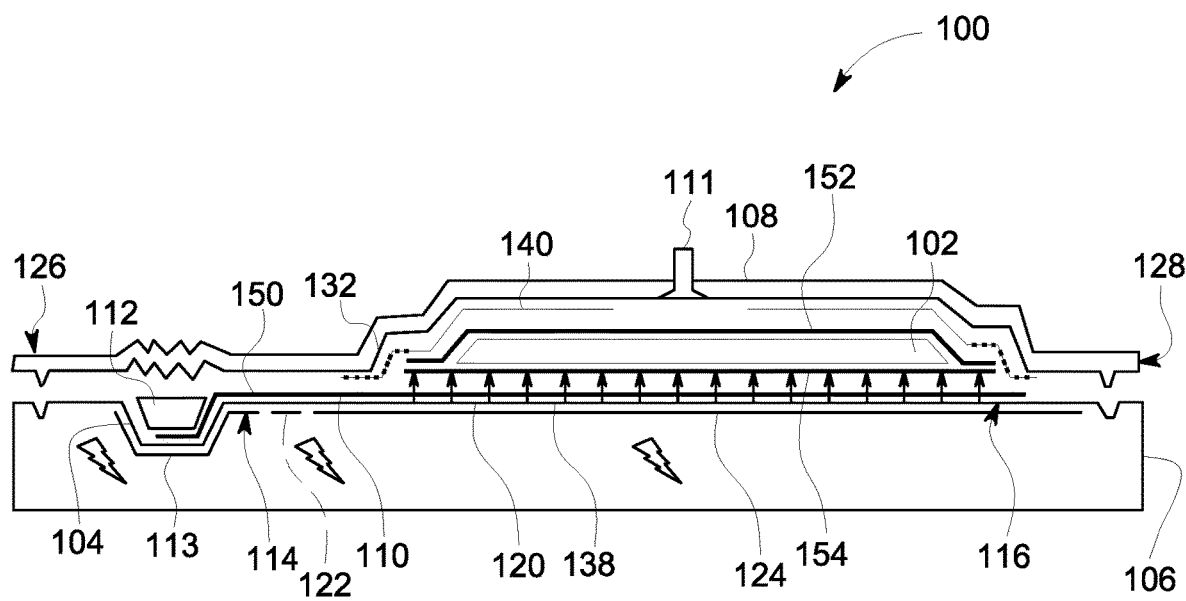
FIG. 4 is a cross-sectional view of the apparatus shown in FIG. 1, in which a plurality of base heating fields are activated.

FIG. 4 is a cross-sectional view of apparatus 100, in which base heating fields 122 and 124 are activated. For example, as the temperature of volume of resin 112 increases within reservoir 104, at least one base heating field 122 and 124 is activated to encourage flow of resin 150 within first flow medium portion 138 of flow medium 110 (step 212). Specifically, at least one base heating field 122 and 124 is activated, such that first flow medium portion 138 is heated. As first flow medium portion 138 increases in temperature, volume of resin 112 flows out of reservoir 104 as flow of resin 150 and into first flow medium portion 138. Further, as flow of resin 150 flows into first flow medium portion 138, flow of resin 150 infuses up through first flow medium portion 138 of flow medium 110 into composite structure 102.

More particularly, base heating fields 122 and 124 are activated according to a first activation sequence to control the rate at which flow of resin 150 flows, infuses, or travels through first flow medium portion 138. In various embodiments, the first activation sequence is controlled manually, based upon a pre-programmed sequence, and/or based upon feedback received from one or more resin flow sensors disposed within base 106. Where the first activation sequence is not performed manually, but based upon a pre-programmed sequence of based upon feedback received from one or more resin flow sensors, a controller (not shown) coupled to apparatus 100 executes the pre-programmed sequences and/or receives feedback and adjusts the activation sequence accordingly.

For example, base heating field 122, which extends from proximal end 114 of base 106, is activated first, such that flow of resin 150 flows out of reservoir 104 and into proximal end 114 of first flow medium portion 138. As flow of resin 150 infuses up through first flow medium portion 138 and into composite structure 102, base heating field 124, which is located axially distal of proximal end 114, is activated, such that flow of resin 150 continues to flow through first flow medium portion 138 towards distal end 116 of base 106. The heat output by each of heating fields 122 and 124 can be individually or independently adjusted or regulated to control the rate at which flow of resin 150 flows through first flow medium portion 138. For example, base heating field 122 is regulated to a first temperature range, and base heating field 124 is regulated to a second temperature range that is different from the first temperature range.

Figure 5:
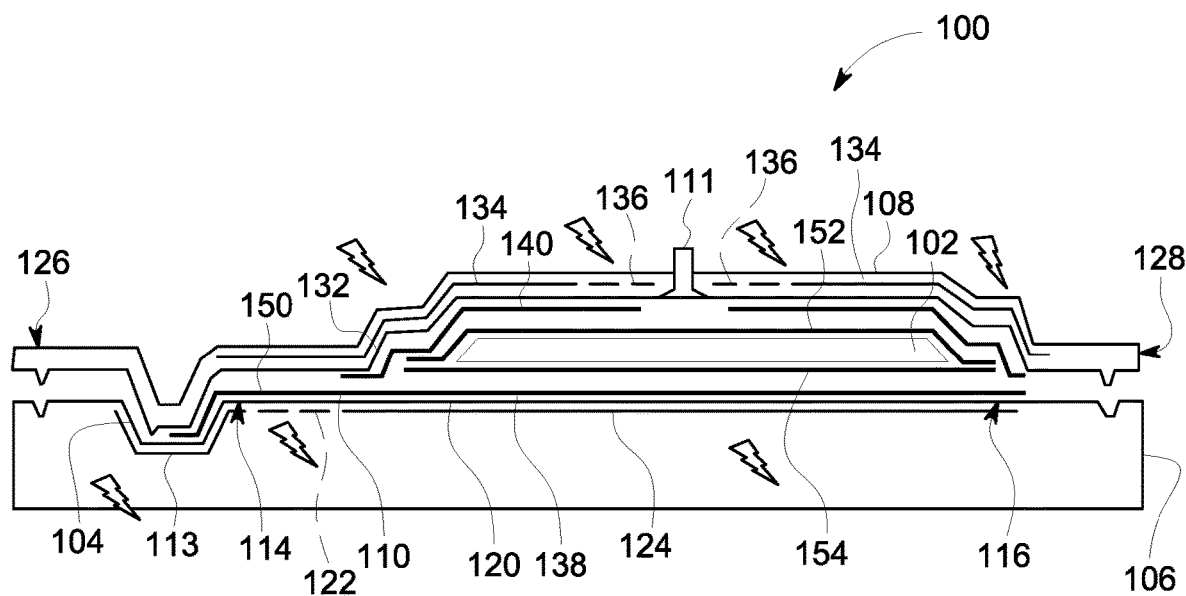
FIG. 5 is a cross-sectional view of the apparatus shown in FIG. 1, in which a plurality of membrane heating fields are activated.

FIG. 5 is a cross-sectional view of apparatus 100, in which membrane heating fields 134 and 136 are activated. In the exemplary embodiment, membrane heating fields 134 and 136 are activated after both of base heating fields 122 and 124 have been activated (as described above with reference to FIG. 4). Thus, in some embodiments, infusion begins in upper portion 152 of composite structure 102 after infusion of lower portion 154 of composite structure 102 has begun. However, in other embodiments, membrane heating fields 134 and 136 are activated first, or base heating fields 122 and 124 are activated substantially in unison with membrane heating fields 134 and 136. Further, in some embodiments, only one of base 106 or membrane 108 is configured to generate heat for infusion.

Accordingly, at least one membrane heating field 134 and 136 is activated, such that second flow medium portion 140 is heated. As second flow medium portion 140 increases in temperature, flow of resin 150 flows out of reservoir 104 and into second flow medium portion 140. Further, as flow of resin 150 flows through second flow medium portion 140, flow of resin 150 infuses down through second flow medium portion 140 of flow medium 110 into composite structure 102.

More particularly, membrane heating fields 134 and 136 are activated according to a second activation sequence to control the rate at which flow of resin 150 flows, infuses, or travels through second flow medium portion 140. In various embodiments, the second activation sequence is controlled manually, based upon a pre-programmed sequence, and/or based upon feedback received from one or more resin flow sensors disposed within membrane 108. Where the second activation sequence is not performed manually, but based upon a pre-programmed sequence of based upon feedback received from one or more resin flow sensors, a controller (not shown) coupled to apparatus 100 executes the pre-programmed sequences and/or receives feedback and adjusts the activation sequence accordingly.

For example, membrane heating field 136 is activated first. Activation of heating field 136 induces flow of resin 150 to flow out of reservoir 104 and into proximal end 126 of second flow medium portion 140. Similarly, activation of heating field 136 induces flow of resin 150 to flow up from distal end 116 of base 106 into second flow medium portion 140. Thus, flow of resin 150 flows into second flow medium portion 140 from reservoir 104 as well as from base 106, which, as described above, infuses composite structure 102 prior to activation of membrane heating fields 134 and 136. In addition, as flow of resin 150 infuses down through second flow medium portion 140 and into composite structure 102, membrane heating field 134, which is located substantially centrally of membrane 108, is activated, such that flow of resin 150 continues to flow through second flow medium portion 140 towards vacuum port 111.

The heat output by each of heating fields 134 and 136 can be individually or independently adjusted or regulated to control the rate at which flow of resin 150 flows through second flow medium portion 140. For example, membrane heating field 134 is regulated to a first temperature range, and membrane heating field 136 is regulated to a second temperature range that is different from the first temperature range. When flow of resin 150 reaches vacuum port 111, port 111 is clamped off and all heating fields 122, 124, 134, and 136 are increased in temperature to cure composite structure 102.

Thus, base heating fields 122 and 124 are activated according to a first activation sequence, and membrane heating fields 134 and 136 are activated according to a second activation sequence (described above). As a result of the first and second activation sequences, a flow rate of flow of resin 150 within first flow medium portion 138 and second flow medium portion 140 can be controlled. For example, as described above, during the first activation sequence, base heating field 122 is activated earlier than base heating field 124, such that flow of resin 150 is encouraged to flow evenly and at a desired rate through first flow medium portion 138. Similarly, during the second activation sequence, membrane heating field 134 is activated earlier than membrane heating field 136, such that flow of resin 150 is encouraged to flow evenly and at a desired rate through second flow medium portion 140 towards vacuum port 111. Composite structure 102 is thus infused with resin at a controlled rate, which results in an even distribution of resin within composite structure 102 that is substantially free of air bubbles, variations in resin thickness, and other imperfections.

Figure 6:
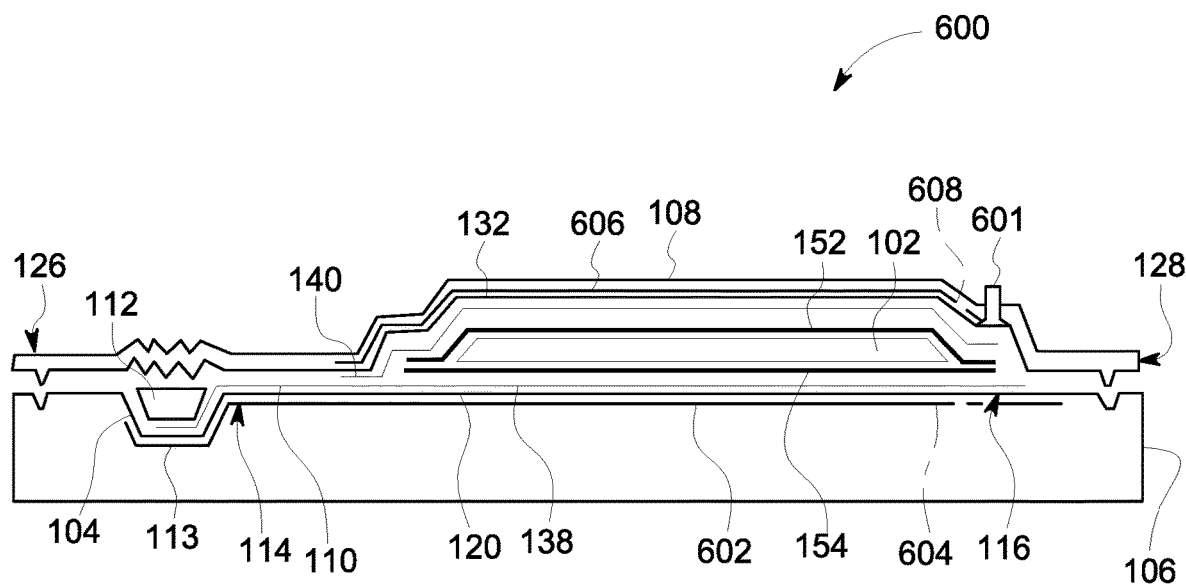
FIG. 6 is a cross-sectional view of an alternative apparatus for infusing a composite structure.

FIG. 6 is a cross-sectional view of an alternative apparatus 600 for infusing composite structure 102. Apparatus 600 is substantially similar to apparatus 100 in structure and operation, except that base heating fields 602 and 604 and membrane heating fields 606 and 608 are in different number, location, and/or dimension, such that vacuum can be pulled through a distal vacuum port 601 (rather than a centrally located vacuum port 111, as in apparatus 100). In such an embodiment, activation sequences for base heating fields 602 and 604 and membrane heating fields 606 and 608 can vary to accommodate the location of vacuum port 601. Similarly, the number, location, and dimensions of base heating fields 602 and 604 and membrane heating fields 606 and 608 can be varied. Further, although two base heating fields 602 and 604 are shown, any number of base heating fields that enable operation of apparatus 100, as described herein, are used. Likewise, although two membrane heating fields 606 and 608 are shown, any number of membrane heating fields that enable operation of apparatus 100, as described herein, are used.

Figure 7:
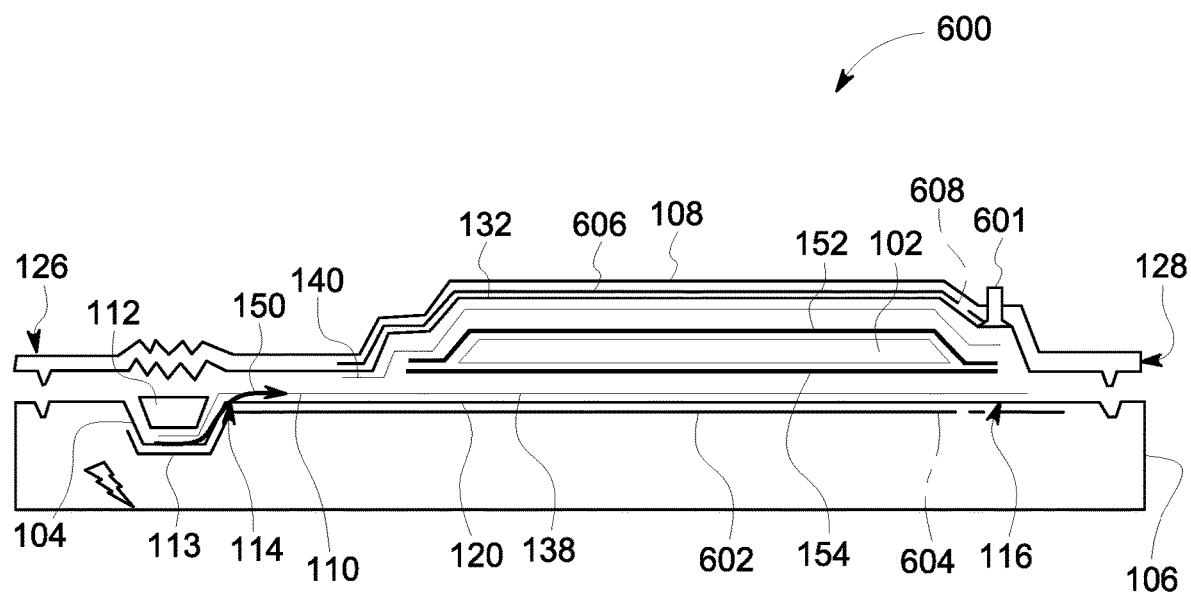
FIG. 7 is a cross-sectional view of the apparatus shown in FIG. 5, in which a reservoir including a volume of resin is heated.

FIG. 7 is a cross-sectional view of apparatus 600, in which a reservoir 104 including a volume of resin 112 is heated. As described above, volume of resin 112 is heated within reservoir 104, such the viscosity of volume of resin 112 is reduced, and such that volume of resin 112 becomes fluid or semifluid.

Figure 8:
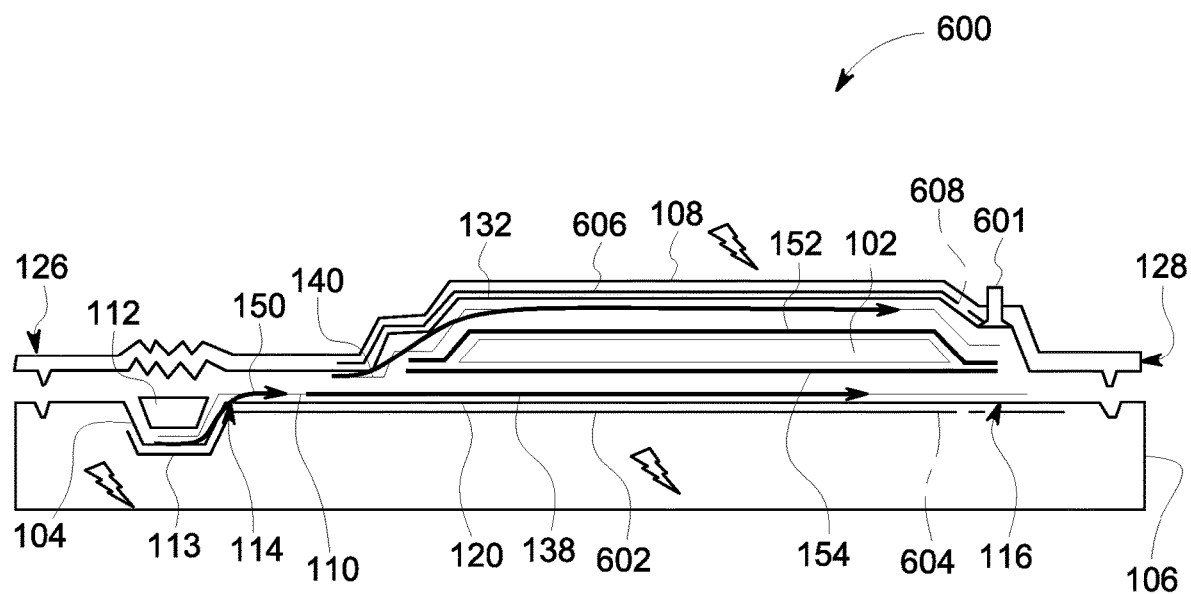
FIG. 8 is a cross-sectional view of the apparatus shown in FIG. 5, in which a base heating field and a membrane heating field are activated.

FIG. 8 is a cross-sectional view of apparatus 600, in which base heating field 602 and membrane heating field 606 are activated. Specifically, base heating field 602 and membrane heating field 606 are activated according to a third activation sequence to control the rate at which flow of resin 150 flows, infuses, or travels through a first flow medium portion 138 of base 106 and second flow medium portion 140 of membrane 108. For example, base heating field 602 and membrane heating field 606, which extend from a proximal end 114 of base 106 and proximal end 126 of membrane 108, respectively, are activated first, such that flow of resin 150 flows out of reservoir 104 and into first flow medium portion 138 and second flow medium portion 140.

Figure 9:
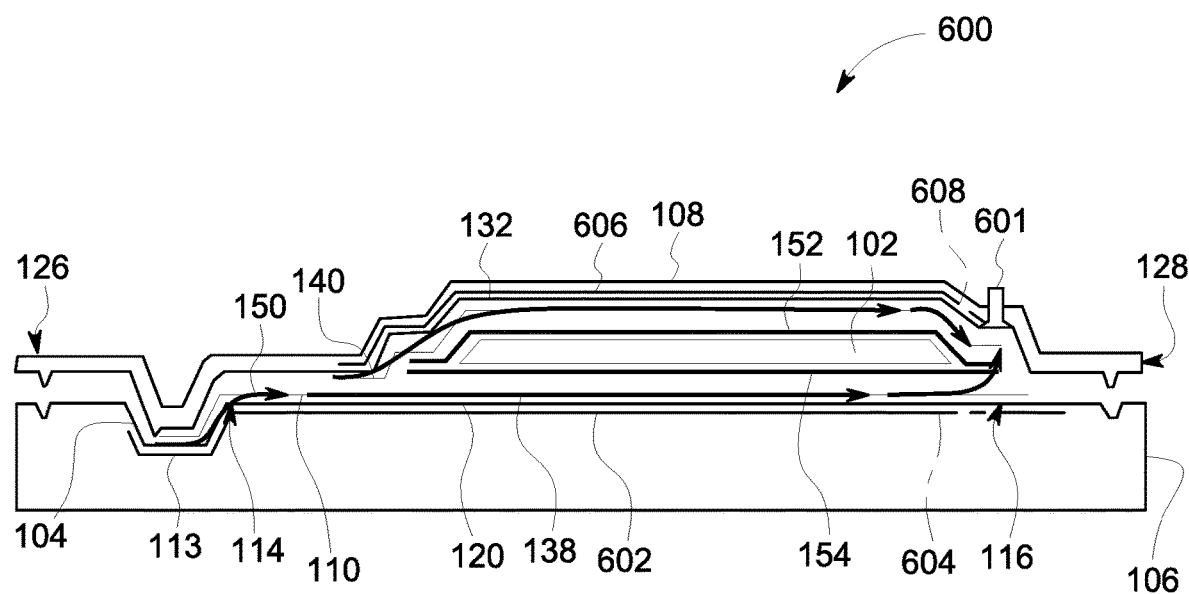
FIG. 9 is a cross-sectional view of the apparatus shown in FIG. 5, in which a base heating field and a membrane heating field are activated.

FIG. 9 is a cross-sectional view of the apparatus 600, in which base heating field 604 and membrane heating field 608 are activated. Specifically, base heating field 604 and membrane heating field 608 are activated according to a fourth activation sequence. For example, after base heating field 602 and membrane heating field 606 are activated according to the third activation sequence (described above), base heating field 604 and membrane heating field 608 are activated, such that flow of resin 150 continues to flow through first flow medium portion 138 towards distal end 116 of base 106 and through second flow medium portion 140 towards distal end 128 of membrane 108. When flow of resin 150 reaches vacuum port 601, the port 601 is clamped off and all heating fields 602-608 are increased in temperature to cure composite structure 102.

Figure 10:
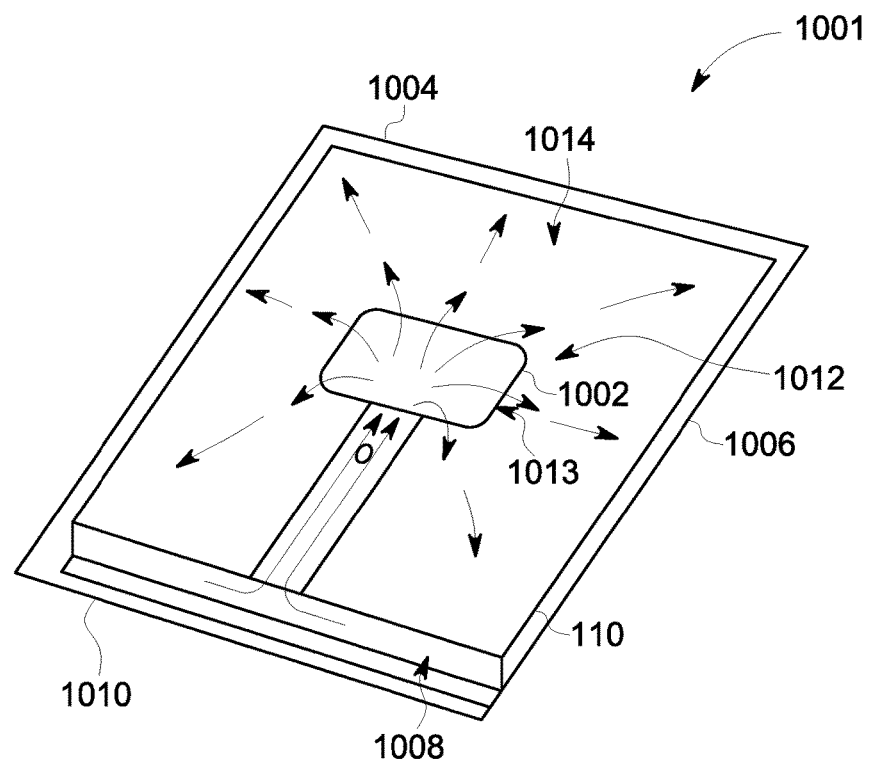
FIG. 10 is a top perspective view of a base of an alternative apparatus.

FIG. 10 is a top perspective view of an alternative base 1000 of an alternative apparatus 1001 for infusing composite structure 102. Base 1000 is substantially similar to base 106, except that base 1000 includes a plurality of base heating fields, such as base heating fields 1002 and 1004. In the exemplary embodiment, base heating field 1002 is substantially T-shaped, and base heating field 1004 is substantially square shaped or rectangular shaped and extends partially about a perimeter 1006 of base 1000. However, any suitable shape may be used for base heating fields 1002 and 1004. Base 1000 further includes a reservoir 1008, which, as described above, is heated by a reservoir heating field 1010.

Figure 11:
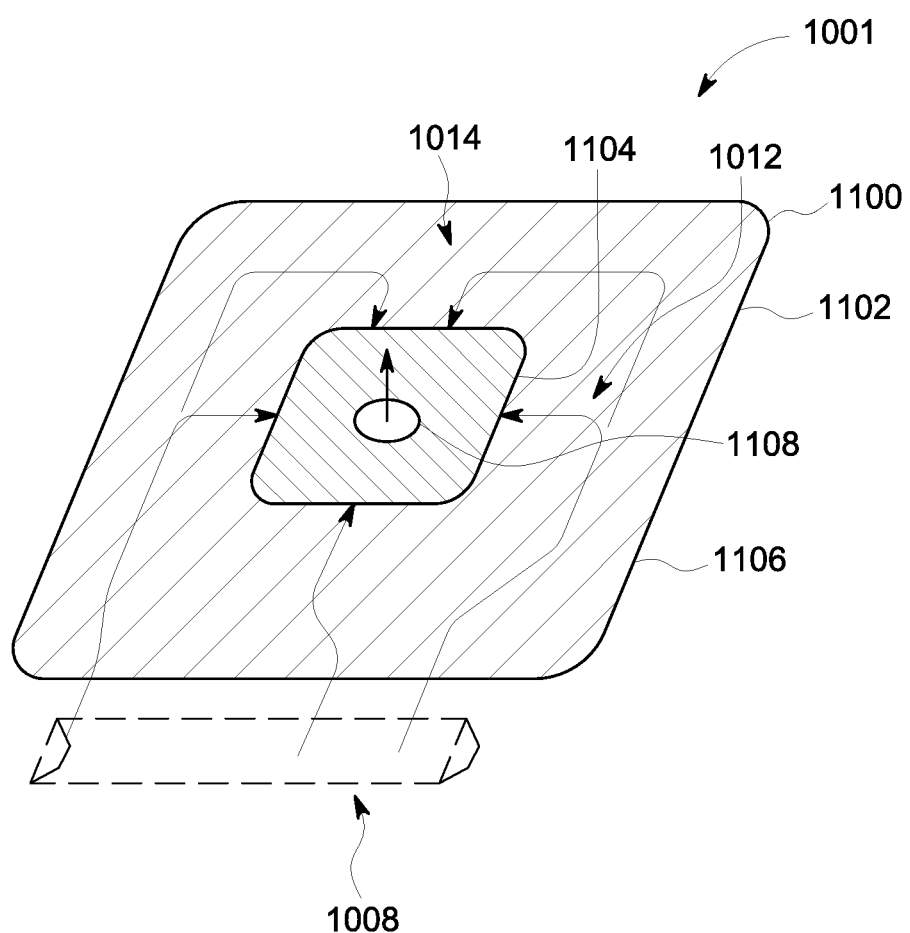
FIG. 11 is a top perspective view of a membrane of the alternative apparatus of FIG. 10.

FIG. 11 is a top perspective view of an alternative membrane 1100 of alternative apparatus 1001 for infusing composite structure 102. Membrane 1100 is substantially similar to membrane 108, except that membrane 1100 includes a plurality of membrane heating fields, such as membrane heating fields 1102 and 1104. In the exemplary embodiment, membrane heating field 1102 is substantially square shaped or rectangular shaped and extends substantially about a perimeter 1106 of membrane 1100, and membrane heating field 1104 is substantially square shaped or rectangular shaped and is disposed substantially centrally of membrane 1100 under a vacuum port 1108. However, any suitable shape may be used for membrane heating fields 1102 and 1104.

In operation, base heating field 1002 and base heating field 1004 are activated according to an activation sequence, similar to the first activation sequence described above. For example, base heating field 1002 is activated first, so that a flow of resin 1012 is drawn from reservoir 1008 into a central portion 1013 of flow medium portion of a flow medium 1014 disposed over base 1000. As flow of resin 1012 is drawn into central portion 1013 of flow medium 1014, base heating field 1004 is activated to draw flow of resin 1012 out towards a perimeter 1006 of base 1000 (within flow medium 1014).

Similarly, membrane heating fields 1102 and 1104 are activated according to an activation sequence, similar to the second activation sequence described above. The activation sequence for membrane 1100 may occur after the activation sequence for base 1000 has taken place. However, in some embodiments, the activation sequence for membrane 1100 occurs prior to the activation sequence for base 1000 or simultaneously with the activation sequence for base 1000.

Accordingly, in the exemplary embodiment, membrane heating field 1102 is activated first to draw flow of resin 1012 into flow medium 1014 from reservoir 1008. Membrane heating field 1102, which extends about perimeter 1106, also draws flow of resin 1012 up from perimeter 1006 of base 1000. As flow of resin 1012 is drawn into flow medium 1014 about perimeter 1106 of membrane 1100, membrane heating field 1104 is activated to draw flow of resin 1012 in, towards a center of membrane 1100. Further, as described above, as flow of resin 1012 reaches vacuum port 1108, vacuum port 1108 is clamped off and the temperatures of each of base heating fields 1002 and 1004 and membrane heating fields 1102 and 1104 increased to cure composite structure 102.

Embodiments of the apparatus, as described above, facilitate a resin infusion process, in which a flow rate of a flow of resin is controlled and controllable based upon activation sequences associated with one or more base heating fields and one or more membrane heating fields. Specifically, one or more base heating fields are activated according to an activation sequence to control a rate at which a flow of resin flows within a first flow medium portion of a flow medium, and one or more membrane heating elements are activated according to another activation sequence to control a rate at which the flow of resin flows within a second flow medium portion of the flow medium. As the flow of resin flows within each of the first and second flow medium portions, the composite structure is infused with resin, resulting in an even distribution of resin within the composite structure.

Exemplary technical effects of the apparatus described herein include, for example: (a) control of a flow rate of a flow of resin within a first flow medium portion of a flow medium; (b) control of a flow rate of the flow of resin with a second flow medium portion of the flow medium; and (c) controlled infusion of a composite structure disposed between the first flow medium portion and the second flow medium portion.

Exemplary embodiments of an apparatus and related components are described above in detail. The apparatus is not limited to the specific embodiments described herein, but rather, components of systems and/or steps of the methods may be utilized independently and separately from other components and/or steps described herein. For example, the configuration of components described herein may also be used in combination with other processes, and is not limited to practice with the apparatus and related methods as described herein. Rather, the exemplary embodiment can be implemented and utilized in connection with many applications where resin infusion is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for infusing a composite structure, said apparatus comprising:
    a reservoir configured to receive a volume of resin;
    a base;
    a membrane configured to be sealed upon said base; and
    a flow medium in fluid communication with said reservoir, said flow medium comprising:
        a first flow medium portion disposed in contact with at least a portion of said base; and
        a second flow medium portion disposed in contact with at least a portion of said membrane,
    wherein said base comprises at least one base heating field configured to heat the resin and cause the resin to flow through said flow medium towards the composite structure along an axial direction, said at least one base heating field extending, along the axial direction, from a first portion of said base that receives the composite structure to a second portion of said base beyond an edge of the composite structure.

2. The apparatus of claim 1, wherein at least one of said reservoir and said membrane comprises a heating field.

3. The apparatus of claim 1, wherein said at least one base heating field comprises a plurality of base heating fields and each base heating field of said plurality of base heating fields is configured to be activated independently.

4. The apparatus of claim 1, wherein said at least one base heating field comprises a plurality of base heating fields and each base heating field of said plurality of base heating fields is configured to be activated according to an activation sequence.

5. The apparatus of claim 4, wherein the activation sequence controls a flow rate of the resin within said first flow medium portion of said flow medium.

6. The apparatus of claim 1, wherein said at least one base heating field comprises a plurality of base heating fields, and wherein a first base heating field is regulated to a first temperature and a second base heating field is regulated to a second temperature that is different from the first temperature.

7. The apparatus of claim 1, wherein said base further comprises a proximal end and a distal end, wherein said at least one base heating field comprises a plurality of base heating fields disposed axially within said base, and wherein said plurality of base heating fields are configured to heat said base over a period of time from said proximal end axially towards said distal end.

8. The apparatus of claim 1, wherein said membrane comprises a plurality of membrane heating fields, and wherein each membrane heating field of said plurality of membrane heating fields is configured to be activated independently.

9. The apparatus of claim 1, wherein said membrane comprises a plurality of membrane heating fields, and wherein each membrane heating field of said plurality of membrane heating fields is configured to be activated according to a predetermined activation sequence.

10. The apparatus of claim 9, wherein the predetermined activation sequence controls a flow rate of the resin within said second flow medium portion of said flow medium.

11. The apparatus of claim 1, wherein said membrane comprises a plurality of membrane heating fields, and wherein a first membrane heating field is regulated to a first temperature and a second membrane heating field is regulated to a second temperature that is different from the first temperature.

12. The apparatus of claim 1, wherein said membrane further comprises a proximal end and a distal end and a plurality of membrane heating fields disposed axially within said membrane, and wherein said plurality of membrane heating fields are configured to heat said membrane over a period of time from said proximal end axially towards said distal end.

13. A method for infusing a composite structure, said method comprising:
    disposing a composite structure on a base;
    disposing a membrane over the composite structure;
    sealing the membrane upon the base;
    heating at least one base heating field to induce a flow of resin within a first flow medium portion of a flow medium disposed between the base and the composite structure; and
    heating at least one membrane heating field to induce a flow of resin within a second flow medium portion of the flow medium disposed between the membrane and the composite structure.

14. The method of claim 13, further comprising:
    depositing a volume of resin in a reservoir; and
    heating a reservoir heating field to reduce a viscosity of the volume of resin.

15. The method of claim 13 further comprising heating a plurality of base heating fields of the base in sequence to control flow rate of the flow of resin within the first flow medium portion of the flow medium.

16. The method of claim 13 further comprising heating a plurality of membrane heating fields of the membrane in sequence to control a flow rate of the flow of resin within the second flow medium portion of the flow medium.

17. An apparatus for infusing a composite structure, said apparatus comprising:
    a reservoir configured to receive a volume of resin;
    a base comprising:
        a central portion configured to receive resin;
        a base perimeter circumscribing said base;
        a first base heating field configured to draw a flow of resin into said central portion; and
        a second base heating field configured to draw the flow of resin out of said central portion onto a surface of said base and towards said base perimeter;
    a membrane configured to be sealed upon said base, said membrane comprising:
        a first membrane heating field configured to draw the flow of resin from said base perimeter towards a perimeter of said membrane; and
        a second membrane heating field configured to draw the flow of resin towards a center of said membrane.

18. The apparatus of claim 1, wherein said membrane comprises a vacuum port disposed at least partially above said first portion, said vacuum port configured to pull a vacuum from a space between said membrane and said base.

19. The apparatus of claim 18, wherein said vacuum port is disposed substantially centrally within said membrane.

20. The apparatus of claim 19, wherein said base further comprises a proximal end and a distal end, wherein said at least one base heating field comprises a plurality of base heating fields disposed axially within said base, wherein said plurality of base heating fields are configured to heat said base over a period of time from said proximal end axially towards said distal end and channel the resin from said proximal end towards said distal end, wherein said membrane comprises a plurality of membrane heating fields disposed axially within said membrane, and wherein said plurality of membrane heating fields are configured to heat said membrane over a period of time and draw the resin from both said distal end of said base and said proximal end of said base towards said vacuum port.

* * * * *